United States Patent [19]
Coltman

[11] 3,739,324
[45] June 12, 1973

[54] SYSTEM FOR VIEWING DETECTED OBJECTS
[75] Inventor: John W. Coltman, Pittsburgh, Pa.
[73] Assignee: Westinghouse Electric Corporation, Pittsburgh, Pa.
[22] Filed: Dec. 22, 1970
[21] Appl. No.: 100,679

[52] U.S. Cl.................. 340/3 C, 340/5 NP, 343/7.9
[51] Int. Cl............................................... G01s 9/66
[58] Field of Search..................... 343/7.9; 340/1 R, 340/3 C, 3 R, 5 H, 5 MP; 356/4, 5; 350/6, 170, 285

[56] References Cited
UNITED STATES PATENTS
2,637,023  4/1953  Peters et al.......................... 343/7.9
2,769,160  10/1956  Fryklund............................ 340/3 C
2,976,362  3/1961  Stamps................................ 178/7.6
3,300,779  1/1967  Sirkis.................................. 343/7.9

Primary Examiner—Richard A. Farley
Attorney—F. H. Henson, D. Schron and E. P. Klipfel

[57] ABSTRACT

An array of sonar receiving elements provides signals to a corresponding array of display lights upon receipt of target signal returns from a field under investigation. The display is viewed by an observer having one eye placed behind a rotating transparent disk having front and rear surfaces at an angle relative to one another, and which angle varies as the disk is rotated, thereby changing the apparent position of the display lights as a function of time.

6 Claims, 11 Drawing Figures

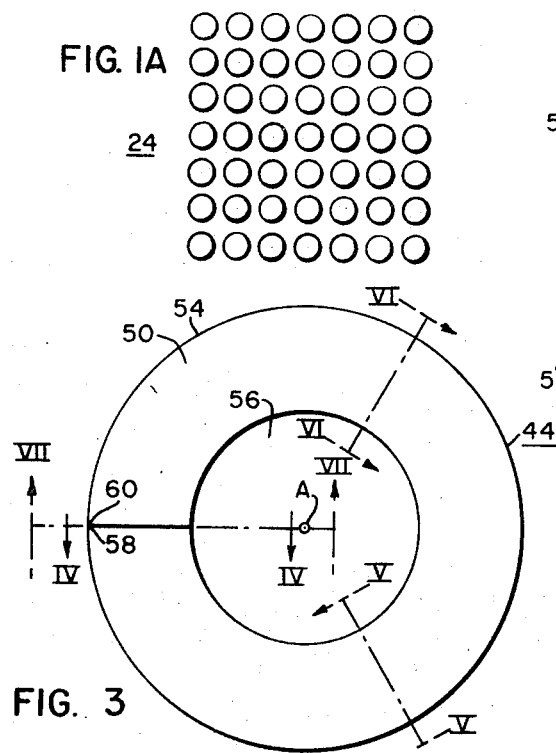
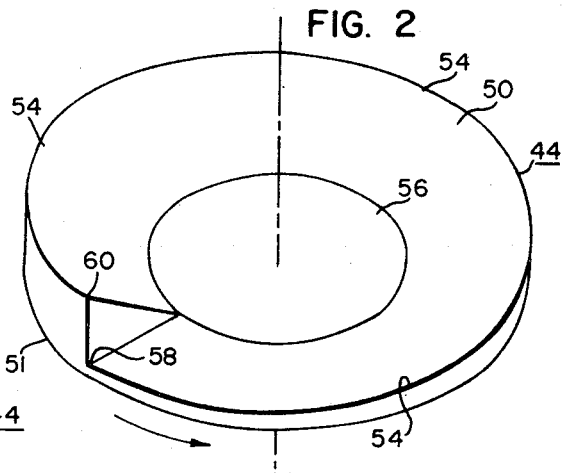
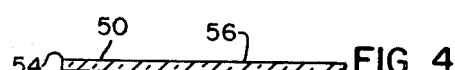
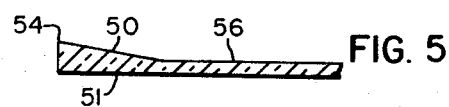
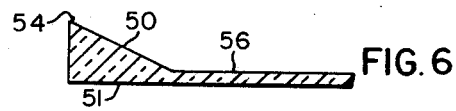
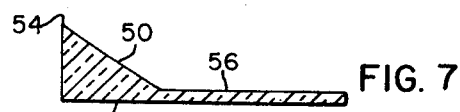
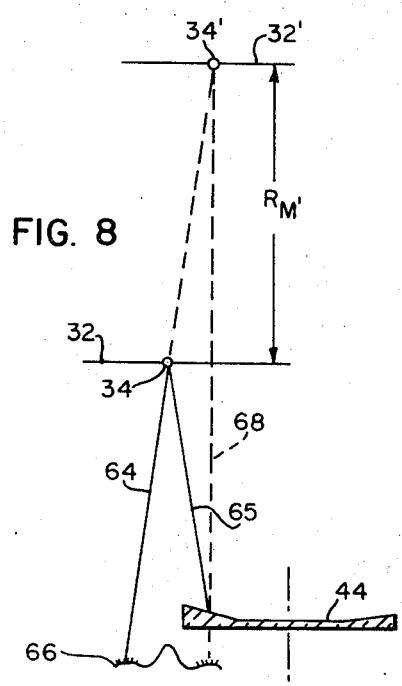
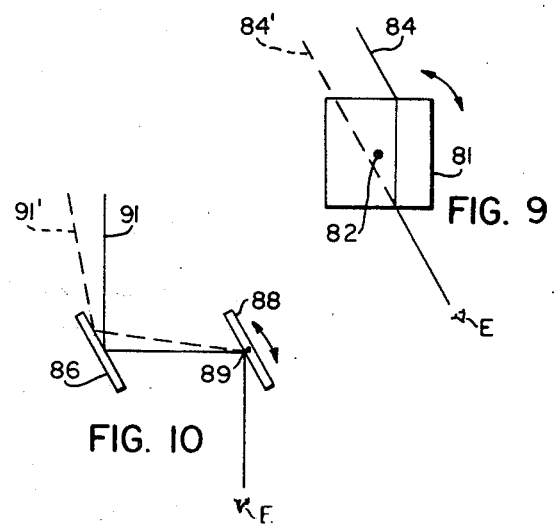

SYSTEM FOR VIEWING DETECTED OBJECTS

BACKGROUND OF THE INVENTION

1. Field of the Invention

Detection systems and particularly the displays therefor.

2. Description of The Prior Art

In multi-element receiver systems, for example sonar, an array of elements is provided with each being operable to receive energy from a discrete area of a field under investigation. The elements are arranged in an array with means for focusing received energy onto individual ones of the elements which in turn provide corresponding output signals. A display is provided and is preferably in a one to one correspondence with the receiver elements, that is the display lights are arranged on a flat panel in a geometry corresponding to the geometrical disposition of the receiving element array. The lighting of a light on the display indicates a target in the field under investigation, however, the observer can only get an indication of the angular orientation of the target but not its range. The present invention provides the desired depth perception.

SUMMARY OF THE INVENTION

Receiving means having a plurality of energy receiving portions in the form of an array of elements, is provided each for receiving energy from a discrete area of a field under investigation. Signals from any target within the field under investigation, when focused on the array, will cause a corresponding one or more of the receiver elements to provide an output signal which is processed and coupled to a display means having a plurality of light emitting areas such as light emitting elements, preferably in the same geometric array as the receiving elements, to thereby indicate the presence of a target in the field. A viewing means for viewing the display is positioned at an observer's location and is placed in front of the observer to vary, as a function of time, the angle at which light rays from the display means are seen by the observer, thus changing the apparent position of the display lights as a function of time.

BRIEF DESCRIPTION OF THE DRAWINGS

FIG. 1a illustrates a geometric arrangement of elements illustrated in FIG. 1;

FIG. 2 is a view of the disk illustrated in FIG. 1;

FIG. 3 is a top view of the disk of FIG. 2;

FIGS. 4 through 7 illustrate sections through the disk of FIG. 3;

FIG. 8 is a light ray diagram illustrating the apparent change in position of a display as seen by an observer; and FIGS. 9 and 10 are variations of a viewing means for observing the display.

DESCRIPTION OF THE PREFERRED EMBODIMENT

Figure 1:
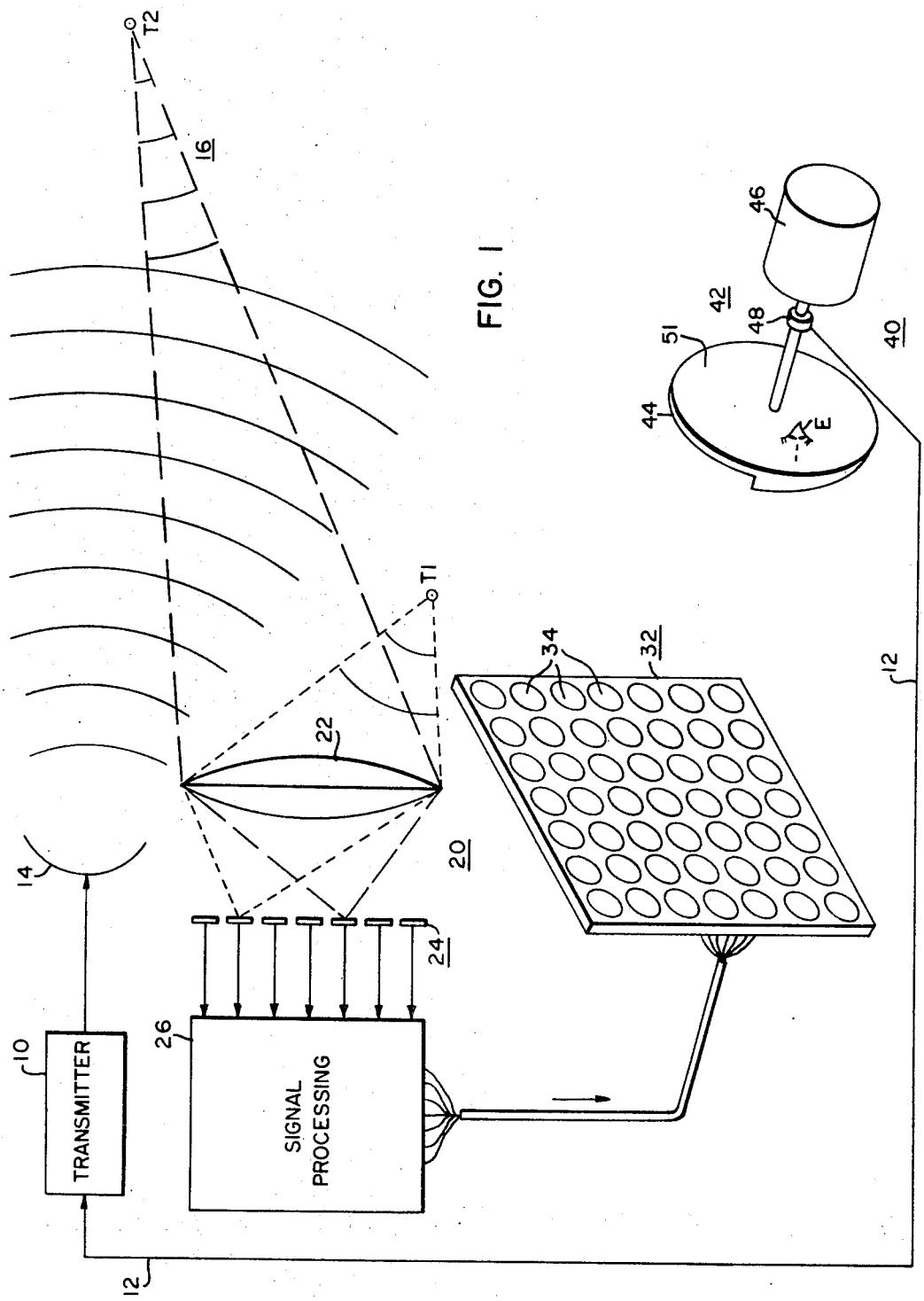
FIG. 1 illustrates a preferred embodiment of the present invention.

In FIG. 1 there is illustrated components of one type of detection system utilized for detecting targets in an underwater environment, however, other arrangements in other environments, for example flaw detection, are also applicable. A transmitter 10, in response to a command pulse on line 12, provides a pulse signal to projector 14 which in response thereto projects a pulse of acoustic energy onto a field 16 under investigation. In order to detect acoustic returns reflected from targets in the field under investigation, there is provided receiver apparatus which includes a lens system 22 operable to focus returned acoustic energy onto individual ones of a plurality of receiver elements 24 arranged in a two-dimensional geometric array as illustrated by way of example in FIG. 1a. In FIG. 1 it is seen that returns from targets T1 and T2 are focused by the lens system 22 onto different receiver elements. (T1 and T2 are actually relatively distant from the lens system). Since target T1 is closer to the receiver apparatus than is target T2, the element receiving its energy will provide a corresponding output signal before the element receiving energy from target T2. The outputs from the receiving elements 24 are processed by signal processing networks 26 which may include such circuitry as frequency filters, time varying gain circuits and threshold detectors, to name a few. Such receiver apparatus incorporating a lens system with a plurality of receiver elements whose output signals are processed, are well known to those skilled in the art.

The signal processing network couples any output signals from the receiver elements 24 to a display means 32 which includes a plurality of light emitting areas shown by way of example as elements 34, preferably arranged in the same geometric pattern as the receiver array with each light emitting element being connected to be responsive to an output signal from a corresponding receiver element, except that the entire display array is inverted so as to compensate for the inversion performed by the lens.

The light emitting elements 34 are fast responding, that is, they can be turned on and off at a rate corresponding to the output signals provided by the associated receiver elements. The light emitting elements may be solid state injection luminescent diodes, electroluminescent elements, gas discharge lamps, to name a few. A target return therefore will cause the activation of one or more light emitting elements 34 in a position on the display means 32 corresponding to the actual position of the target in the field under investigation.

Since the light emitting elements 34 are in a one to one correspondence with the receiver elements 24, an observer at location 40 may view the display 32 and when a target causes one or more lights to go on, he can get an indication of the bearing of the target. The target however may be anywhere between the receiver apparatus and a maximum range $R_m$, $R_m$ being determined by system parameters.

In order to provide an observer at the location 40 with a depth perception capability indicative of target range, there is provided a viewing means operable to vary, as a function of time, the angle at which light rays from the display means 32 relatively enter the eyes of the observer with the varying angle changing the apparent position of the display away from the observer so that the observer will see a target return at a position corresponding to the position of the actual target relative to the maximum range.

In the embodiment illustrated in FIG. 1, the viewing means includes an optical device in the form of transparent disk 44 which is positioned in front of one eye of the observer, and which is rotated by means of motor 46. Each complete rotation of the disk 44 represents an investigatory sweep from the receiver apparatus out to the maximum range of the field under investigation (taking into an account the round trip travel time of the acoustic energy). When the disk 44 returns to its initial reference position an acoustic pulse is provided by the projector 14. In order to synchronize this operation, a synchronizing means 48 coupled to the motor 46 or the shaft thereof provides an electrical signal on line 12 for each complete rotation of the shaft and this electrical signal forms the command pulse for transmitter 10.

The disk 44, another view of which is illustrated in FIG. 2, is rotatable about an axis A and includes a front surface 50 and a rear surface 51. The front surface 50 slopes downwardly from an edge to a central portion 56 to which the motor 46 is coupled and which need not be optically transparent. Starting from a reference position, for example at 58 and proceeding around the periphery of disk in the direction of the arrow, the thickness of the disk, as measured at the outermost edge thereof, progressively increases up to a maximum at point 60.

A top view of the disk, including the reference numerals of FIG. 2, is illustrated in FIG. 3. Sections of the disk along lines IV—IV to VII—VII are respectively illustrated in FIGS. 4 through 7. The angle defined by the front and rear surfaces 50 and 51 increases from a minimum illustrated in FIG. 4 to the maximum illustrated in FIG. 7. The minimum to maximum angle is achieved in one revolution of the disk, after which the cycle is repeated. For some applications the disk could be divided up into a plurality of sections, each section having front and rear surfaces which progress from a minimum to a maximum angular relationship.

The prismatic action of the surfaces of the disk, when placed before the observer's eye, changes the angle at which light rays from the display enter the eye. This operation may be demonstrated with reference to FIG. 8.

In FIG. 8 let it be assumed that a target return has caused element 34 of display 32 to emit light. A light ray 64 enters the left eye of the observer 66. The surfaces of the disk 44 provide a prism structure in front of the right eye of the observer causing light ray 65 which enters the right eye of the observer, to appear to come from a more distant point along the path 68 which intersects the extension of light ray 64 at a point designated at 34' and which is the apparent position of light from the element 34. At the instant of time illustrated in FIG. 8, light from any element on display 32 will appear to emanate from the apparent display 32'.

For a given index of refraction of the transparent disk material, the angle that the front surface makes with the rear surface of the disk determines the apparent position of the display and, accordingly, any light on the display. The maximum angle results in a maximum apparent displacement designated $R'_m$ which corresponds to the maximum range $R_m$ in the field under investigation.

At an instant of time past that illustrated in FIG. 8 a flat section of disk, as illustrated in FIG. 4, will be brought before the observer's eye and substantially no refraction of a light ray such as 65 will take place and thus the observer sees the light or lights on display 32 at their actual position. It is seen therefore that with each complete rotation of the disk 44 the display will be swept out to a position 32' and is available for receipt of target information any time during the sweep such that an observer will see a light at a position in the field from 32 to 32' which corresponds and may be made proportional to the position of an actual target in the field from the receiver 20 out to a maximum range $R_m$ of FIG. 1. The scale of this model is determined by the design of the surfaces 50 and 51 of the disk.

Although the single unidirectionally rotating disk provides the simplest means for charging the angle at which light rays from the display relatively enter the eyes of the observer, other optical means may be provided. For example, FIG. 9 illustrates a transparent block 81 which is rotated about an axis 82 to displace the position of light ray 84 to 84'. In FIG. 10 a dual mirror arrangement is provided wherein light strikes stationary mirror 86 and is reflected from oscillating mirror 88, oscillating about axis 89 in the direction of the arrow to vary the position of light ray 91 to 91'.

While the invention has been described, for simplicity, in terms of discrete receiving elements and discrete lamps, it will be understood that the same principles are applicable when either the receiving or display arrays, or both are continuous. For example, a pressure sensitive crystal may be scanned by a cathode ray beam to act as a receiver, and the display consists of a cathode ray tube of the type familiar in television kinescopes. It is necessary only that the time at which a particular display area is lit corresponds to the time at which its corresponding receiver area was excited.

I claim as my invention:

1. A system for viewing detected objects comprising:
  a. receiving means having a plurality of energy receiving portions each for receiving energy from a discrete area of a field under investigation, for providing corresponding output signals;
  b. display means including a plurality of light emitting areas connected to be responsive to said output signals for emitting light;
  c. an observer's location for an observer to view said display means;
  d. viewing means positioned at said observer's location for varying, as a function of time, the apparent position of said display means, as seen by said observer;
  e. said viewing means including a transparent disk for placement in front of one eye of said observer and rotatable about an axis;
  f. said disk having a front and rear surface;
  g. the angle that said front surface makes with said rear surface being variable.

2. Apparatus according to claim 1 wherein:
  a. said light emitting areas are discrete light emitting elements.

3. Apparatus according to claim 1 wherein said viewing means includes:
  a. a transparent optical device;
  b. means for rotating said optical device about an axis;
  c. said optical device being positionable in the vicinity of said eye of said observer to vary the angle at which light rays enter said eye as said device is rotated.

4. Apparatus according to claim 2 wherein:
  a. said rotation is unidirectional.

5. Apparatus according to claim 2 wherein:
  a. said rotation is bi-directional.

6. Apparatus according to claim 2 which additionally includes:
  a. means responsive to said rotation for periodically projecting acoustic energy onto said field under investigation.

* * * * *